Patented Aug. 28, 1951

2,565,898

UNITED STATES PATENT OFFICE 2,565,898

PROCESS FOR THE MANUFACTURE OF METALLIFEROUS AZO DYESTUFFS

Willi Widmer, Bottmingen, and Christian Zickendraht, Binningen, Switzerland, assignors to Ciba Limited, Basel, Switzerland, a Swiss firm No Drawing. Application September 18, 1947, Serial No. 774,879. In Switzerland September 30, 1946

9 Claims. (Cl. 260—147)

This invention is based on the observation that valuable metalliferous dyestuffs are obtained by the action of agents yielding metal upon dyestuffs which are free from sulphonic acid groups and contain groupings capable of leading to the formation of complexes, when the treatment with the agent yielding metal is conducted in a neutral to alkaline medium in the presence of an aromatic ortho-hydroxycarboxylic acid and with an amount of the agent yielding complex-forming metal corresponding to less than one atom of metal for each grouping in the dyestuff capable of forming a complex.

Among the dyestuffs suitable as starting materials for the present invention there come principally into consideration azo-dyestuffs, and among the latter, especially monoazo-dyestuffs. As groupings capable of leading to the formation of complexes there may be mentioned, for example, ortho-hydroxycarboxylic acid groupings, such as are present, inter alia, in salicylic acid residues. As a grouping capable of leading to the formation of complexes in azo-dyestuffs the grouping

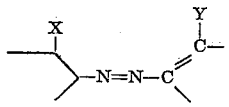

is of particular importance, where X and Y each represent a group taking part in the formation of complexes, for example, a substituted or non-substituted hydroxyl group, a carboxyl group or an amino group. As examples of such groupings there may be mentioned the following:

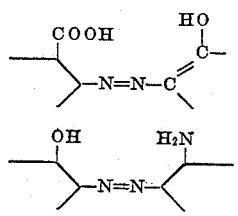

and especially

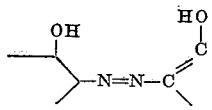

As is generally known, the groupings capable of leading to the formation of complexes, which determine the proportion of the complex-forming metal to be used in this invention, are not the individual substituents present in ortho-position with respect to the azo-group. For determining the proportion of metal to be used only the whole grouping consisting of the azo-group and the two substituents of the aforesaid kind in ortho-position comes into consideration. In the case of the ortho-hydroxycarboxylic acid groupings hereinbefore referred to, the hydroxyl group and the carboxyl group together constitute one grouping capable of leading to the formation of complexes.

When ortho:ortho' - dihydroxy - azo - dyestuffs containing the grouping

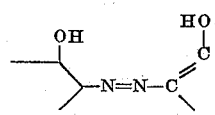

are used as starting materials, they may be derived, for example, from ortho-hydroxy-diazo-components of the naphthalene, but especially of the benzene, series. They may be derived from coupling components capable of coupling in ortho-position with respect to a hydroxyl group in an aromatic nucleus, or from coupling components which owe their capacity for coupling to a keto-methylene group.

The azo-dyestuffs used as starting materials may contain a very wide variety of substituents, with the exception of sulphonic acid groups, in the diazo-components as well as in the azo-components, for example, halogen atoms such as bromine or chlorine atoms, alkyl groups such as methyl groups, alkoxy-groups such as methoxy groups, nitro groups, acylamino groups or —SO₂R groups, in which R may represent an alkyl, aryl or aralkyl group or the group $$-N\diagdown_Y^X$$

in which X may represent hydrogen, alkyl, aryl or aralkyl, and Y represents hydrogen, alkyl or aralkyl. A single substituent or two or more substituents, which may be the same or different, may be present in the azo-dyestuff. As examples of diazo-components which lead to mono-azo-dyestuffs coming into consideration as starting materials for this invention, there may be mentioned:

2-amino-1-hydroxybenzene, 4- or 5-chloro-2-amino-1-hydroxybenzene, 4:6-dichloro- or 3:4:6-trichloro- or 3:4:5:6 - tetrachloro - 2 - amino - 1 - hydroxybenzene, 4- or 5-nitro-2-amino-1-hydroxybenzene, 4-chloro-5-nitro- or -6-nitro-2-amino-1-hydroxybenzene, 4-nitro-6-chloro - 2 - amino-1-hydroxybenzene, 4:6-dinitro-2-amino-1-hydroxybenzene, 5- or 6-nitro-4-methyl-2-amino-1-hydroxybenzene, 4-nitro - 6 - acetyl-amino- or 6-nitro-4-acetylamino-2-amino-1-hydroxybenzene, 2-amino-1-hydroxybenzene-4-sulphonamide or -4-sulphonic acid anilide or -4-sulphonic acid alkylanilide, 3-amino-4-hydroxy-benzanilide, 3 - amino-4-hydroxy-5-chlorobenz-anilide, 3-amino-4-hydroxy-1-acetophenone, 3-amino-2-hydroxy - 5 - chlorobenzanilide, 1-hydroxy-2-aminonaphthalene and 2-hydroxy-1-aminonaphthalene.

As examples of azo-components there may be mentioned:

2-hydroxynaphthalene, 1 - hydroxynaphthalene, 2-aminonaphthalene, 5:8-dibromo- or 5:8-dichloro-1-hydroxynaphthalene, 5-chloro-1-hydroxynaphthalene, 5:8-dichloro - 2 - hydroxynaphthalene, 4-hydroxy-1-naphthyl phenyl ketone, 6-bromo-2-hydroxynaphthalene, 4-alkyl-1-hydroxynaphthalenes such as 4-n-butyl-1-hydroxynaphthalene, arylides of 2-hydroxynaphthalene-3-carboxylic acid, 3-hydroxynaphthalene-1:8-dicarboxylic acid, 3-aminonaphthalene-1:8-dicarboxylic acid, 1:5- or 1:6- of 1:7- or 1:8-dihydroxynaphthalene, 2:3- or 2:6- or 2:7-dihydroxynaphthalene, monoalkyl ethers derived from these dihydroxy-naphthalenes, aminonaphthols, acylaminonaphthols, hydroxynaphthalene sulphonic acid amides such as 2-hydroxynaphthalene-6-sulphonic acid amide or -6-sulphonic acid anilide, 1:3-dihydroxybenzene, 4-methyl-1-hydroxybenzene, 2 - acetylamino - 4 - methyl-1-hydroxybenzene, 4 - acetylamino - 3 - methyl-1-hydroxybenzene, acetoacetic acid arylides such as acetoacetic acid anilide, 3-methyl-5-pyrazolone, especially 1-phenyl-3-methyl-5-pyrazolone, 1-aryl-3-methyl-5-pyrazolones and derivatives thereof substituted in the aryl residue, 2:4-dihydroxyquinoline, N - alkyl - 4 - hydroxy-2-quinolones such as N-isoamyl-4-hydroxy-2-quinolone, etc.

Among the agents yielding metal suitable for use in the present invention there may be mentioned, for example, agents yielding cobalt, iron, manganese, aluminium, copper or nickel, but above all agents yielding chromium.

If desired, the process may be used for producing mixed metal compounds containing more than one of the aforesaid metals, by causing to act on the dyestuff simultaneously or in succession agents yielding metal, which altogether contain at least two complex-forming metals. When agents yielding different metals are applied in succession, the metallisation with one complex-forming metal may be carried out first by any desired process and subsequently with another metal by the process of the present invention, but these operations may be carried out in the reverse order of succession. In general, however, it is of advantage to carry out simultaneously the treatments with agents yielding different metals. In all these cases the quantities of the starting materials are so chosen in accordance with the invention that the total amount of agents yielding metal corresponds to less than one atom of metal for each grouping capable of leading to the formation of complexes present in the dyestuff.

The aromatic ortho-hydroxycarboxylic acids, in the presence of which the conversion of the dyestuffs into metal compounds is carried out, may belong, for example, to the naphthalene series, but above all to the benzene series. There are advantageously used aromatic ortho-hydroxycarboxylic acids which are free from sulphonic acid groups, such as, for example, 6-, 5-, or 4-methyl-1-hydroxybenzene - 2 - carboxylic acid and above all 1-hydroxybenzene-2-carboxylic acid. In accordance with this invention the present process is conducted in a neutral to alkaline medium, so that the aromatic ortho-hydroxycarboxylic acids, according to common apprehension, are not present in the reaction mixture as free acids, but as salts or complex metal compounds.

As a rule it is of advantage to use as agents for the conversion of the dyestuffs into metal compounds, complex compounds of the appropriate metals with ortho-hydroxycarboxylic acids. Such complex compounds may be prepared, for example, by heating a salt or hydroxide of the complex-forming metal with an aromatic ortho-hydroxycarboxylic acid, and adding one or more alkali hydroxides and/or ammonium hydroxide.

The conversion of the dyestuffs into the metal compounds is conducted with advantage with the aid of heat, under atmospheric or superatmospheric pressure, for example, at the boiling temperature of the reaction mixture, and, if desired, in the presence of suitable additions such as neutral salts or bases, organic solvents or other agents assisting the formation of complexes. As such agents there are to be mentioned primarily wetting or dispersing agents. Favorable results can be produced, for example, by working in the presence of a soap produced from potassium oleate and pine oil and containing solvents, or in the presence of sulphonated castor oils such, for example, as are known in commerce under the name Turkey red oil. By working in the presence of such a dispersing agent the period of reaction can be considerably shortened in many cases. Moreover, the products obtained in this manner may be distinguished by an improved solubility in organic solvents, for example, alcohol.

The aromatic ortho-hydroxycarboxylic acids used in the present process can in most cases be recovered for the greater part from the reaction mixture, for example, by precipitation with mineral acid followed by filtration, after isolating the metal compound of the dyestuff.

In accordance with this invention there is used less than one atomic proportion of the complex-forming metal for each grouping in the dyestuff capable of leading to the formation of complexes. When chromium is chosen as the complex-forming metal, it is of advantage to use more than 0.3 and less than 0.9 atomic proportions of chromium for each grouping leading to the formation of a complex. Advantageous results are generally obtained with ratios of about 0.5 to 0.7, whereby, as a rule, the so-called 1:2-complexes are formed, that is to say, complexes which contain one atom of chromium in complex union with two molecules of dyestuff.

The resulting metal compounds, especially chromium compounds, of these dyestuffs are generally only slightly soluble in water and in dilute alkalies, but possess good solubility in various organic solvents such as are used, more especially, for lacquers and spinning masses. The dyestuffs are also suitable as transparent colouring matters for lacquers, for example, nitrocellulose ester lacquers, and especially also for colouring masses which consist of natural or artificial resins, cellulose derivatives, or of animal substances such as casein or gelatine. There are obtained tints which are very fast to light.

They can also be used for dyeing artificial fibers of superpolyamides or superpolyurethanes.

As compared to the prior art process under U. S. Patent 2,417,735, which describes the production of chromiferous dyestuffs by treating chromable dyestuffs with agents yielding chromium in the presence of aromatic ortho-hydroxycarboxylic acids and using at least one atom of chromium for each group capable of forming a metal complex, the present process presents the great advantage of leading to metalliferous dyestuffs which dissolve more readily in organic solvents such as ethyl-alcohol or acetone and/or leave but little undissolvable residue.

As compared with the metalliferous dyestuffs obtained by the process of U. S. Patent 1,994,116 by treating unsulphonated dyestuffs with agents yielding metal in the presence of aliphatic hydroxycarboxylic acids, the corresponding products according to the present process are also distinguished by their superior solubility in organic solvents. A further advantage of the new process consists in the considerably shorter time required for the reaction.

The following examples illustrate the invention, the parts being by weight:

Example 1

36.4 parts of the sodium salt of the dyestuff from diazotized 4-nitro-2-amino-1-hydroxybenzene and acetoacetic acid anilide and corresponding to the formula

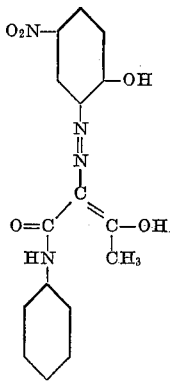

are suspended in 200 parts of water. 120 parts of a solution of sodium-potassium chromosalicylate, having a chromium content of 2.6 per cent., are added. After boiling the whole for 6 hours in a reflux apparatus the chroming is complete. After cooling, acetic acid is added until the reaction is acid to litmus, and the precipitated dyestuff is separated by filtration. It is washed well and dried at a moderate temperature. The dyestuff is a yellow-brown powder, which dissolves in boiling water and in alcohol with a greenish yellow coloration. With a solution of the dyestuff in nitro-cellulose lacquer greenish yellow coatings can be produced on suitable substrata.

The dark green solution of sodium-potassium chromo-salicylate is obtained by boiling 362 parts of an aqueous solution of chromic sulphate having a chromium content of 7.2 per cent. with 138 parts of salicylic acid, dissolving the resulting chromosalicylic acid by the addition of 166 parts of a sodium hydroxide solution of 30 per cent. strength and a sufficient quantity of a potassium hydroxide solution of 37 per cent. strength to produce a reaction distinctly alkaline to phenolphthalein, and making up the whole to 1000 parts with water.

Example 2

37.5 parts of the sodium salt of the dyestuff from diazotized 4-methyl-6-nitro-2-amino-1-hydroxybenzene and 1-phenyl-3-methyl-5-pyrazolone are suspended in 200 parts of water, and mixed with 120 parts of a solution of sodium chromosalicylate having a chromium content of 2.6 per cent. After boiling the whole for 2 hours in a reflux apparatus the chroming is complete. The product is worked up as described in Example 1, and a violet powder is obtained which dissolves sparingly in boiling water and easily in alcohol with a ruby red coloration. With a solution of the dyestuff in nitrocellulose lacquer red coatings can be produced on suitable substrata.

The dark green solution of sodium chromosalicylate is obtained by boiling 362 parts of an aqueous solution of chromic sulphate having a chromium content of 7.2 per cent. with 138 parts of salicylic acid, dissolving the resulting chromosalicylic acid by the addition of a sufficient quantity of sodium hydroxide solution of 30 per cent. strength to produce a reaction which is distinctly alkaline to phenolphthalein, and making up the whole with water to 1000 parts.

Example 3

36.2 parts of the sodium salt of the dyestuff from diazotized 4-nitro-2-amino-1-hydroxybenzene and 1-phenyl-3-methyl-5-pyrazolone are suspended in 200 parts of water, and mixed with 150 parts of a solution of sodium-ammonium chromosalicylate having a chromium content of 2.08 per cent. After boiling the whole for 6 hours the chroming is complete. After cooling acetic acid is added until the reaction is acid to litmus, the precipitated dyestuff is separated by filtration, and dried. The dyestuff is a red-brown powder which dissolves sparingly in boiling water. It dissolves easily in alcohol and acetone with a yellowish red coloration. With a solution of the dyestuff in nitrocellulose lacquer orange-yellow coatings can be produced on suitable substrata.

The blue-green solution of sodium-ammonium chromo-salicylate is obtained by boiling 362 parts of an aqueous solution of chromic sulphate containing 7.2 per cent. of chromium with 138 parts of salicylic acid, dissolving the resulting chromosalicylic acid by the addition of 166 parts of sodium hydroxide solution of 30 per cent. strength and a sufficient quantity of ammonia solution to produce a reaction distinctly alkaline to phenolphthalein, and making up the whole with water to 1250 parts.

The same chromiferous dyestuff is obtained by boiling 0.1 mol of the above named sodium salt with 120 parts of a solution of sodium-potassium chromocresotinic acid, having a chromium content of 2.6 per cent., for 10 hours. The latter solution is obtained by boiling 174 parts of sodium ortho- or para-cresotinate with 362 parts of an aqueous solution of chromic sulphate having a chromium content of 7.2 per cent., dissolving the resulting chromo-cresotinic acid by the addition of a sufficient quantity of potassium hydroxide solution of 37 per cent. strength to produce a reaction which is distinctly alkaline to phenolphthalein, and making up the whole to 1000 parts with water.

Example 4

36.2 parts of the sodium salt of the dyestuff from diazotised 5 - nitro - 2 - amino - 1 - hydroxybenzene and 1-phenyl-3-methyl-5-pyrazolone and corresponding to the formula

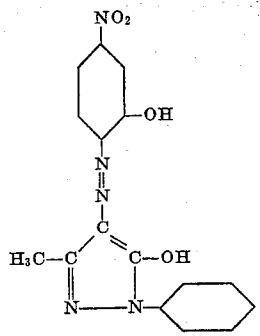

are mixed with 240 parts of a solution of chromium-aluminium-salicylic acid complex having a chromium content of 0.86 per cent., and an aluminium content of 0.22 per cent., and the whole is boiled in a reflux apparatus. After 2 hours the metallisation is complete. Acetic acid is added until the reaction is acid to litmus, the precipitated dyestuff is separated by filtration, washed, and dried. The dyestuff is a violet powder which is sparingly soluble in boiling water and easily soluble in alcohol to give a ruby red coloration. With a solution of the dyestuff in nitrocellulose lacquer bluish red coatings can be produced on suitable substrata.

The dark green solution of the chromium-aluminium-salicylic acid complex is obtained by boiling 120 parts of an aqueous solution of chromic sulphate containing 7.2 per cent. of chromium, 27.8 parts of $Al_2(SO_4)_3 \cdot 18H_2O$ and 69 parts of salicylic acid, dissolving the resulting precipitate by the addition of a sufficient quantity of a sodium hydroxide solution of 30 per cent. strength to produce a reaction distinctly alkaline to phenolphthalein, and making up the whole to 1000 parts with water.

A chromiferous dyestuff with similar properties can be prepared by using the same monoazo-dyestuff as starting material and reacting it with the solution of the chromium complex of salicylic acid described in Example 1.

*Example 5*

44.2 parts of the sodium salt of the dyestuff from diazotised 4-nitro-2-amino-1-hydroxybenzene and acetoacetic acid anilide-meta-sulphonamide are suspended in 200 parts of water and mixed with 120 parts of the solution of the chromium complex described in Example 1. After boiling for 6 hours the chroming is complete. The chromed dyestuff is precipitated by acidification with acetic acid, filtered, and washed. It is a yellow-brown powder which dissolves in boiling water and in alcohol with a greenish yellow coloration. With a solution of the dyestuff in nitrocellulose lacquer golden yellow coatings can be produced on suitable substrata.

*Example 6*

39.6 parts of the sodium salt of the dyestuff from diazotised 4-chloro-6-nitro-2-amino-1-hydroxybenzene and 1-phenyl-3-methyl-5-pyrazolone are pasted with 200 parts of water, and 110 parts of the solution of the chromium complex described in Example 1 are added. The whole is boiled for 6 hours in a reflux apparatus. When dry the dyestuff so obtained is a violet powder which is insoluble in water and dissolves in alcohol and acetone with a red coloration. With a solution of the dyestuff in nitrocellulose lacquer copper-red coatings can be produced on suitable substrata.

*Example 7*

43.4 parts of the sodium salt of the dyestuff from diazotised 4-chloro-2-amino-1-hydroxybenzene and 2:3-hydroxynaphthoic acid anilide are suspended in 200 parts of water, and mixed with 120 parts of the solution of the chromium complex described in Example 1. After boiling for 5 hours chroming is complete. When worked up the dyestuff is a violet powder, which is sparingly soluble in boiling water and easily soluble in alcohol with a violet coloration. With a solution of the dyestuff in nitrocellulose lacquer reddish violet coatings can be produced on suitable substrata.

*Example 8*

43.4 parts of the sodium salt of the dyestuff from diazotised 5-nitro-2-amino-1-hydroxybenzene and 4-hydroxy-1-naphthyl phenyl ketone are suspended in 200 parts of water, and mixed with 120 parts of the solution of the chromium complex described in Example 1. After boiling for 4 hours the chroming is complete. When worked up the dyestuff is a dark blue powder, which is sparingly soluble in boiling water and easily soluble in alcohol with a blue coloration. With a solution of the dyestuff in nitrocellulose lacquer blue coatings can be produced on suitable substrata.

*Example 9*

38.2 parts of the sodium salt of the dyestuff from diazotised 2-amino-1-hydroxybenzene-4-sulphonamide and 2:4-dihydroxyquinoline are suspended in 200 parts of water, and mixed with 120 parts of the solution of the chromium complex described in Example 2. After boiling the whole for 1 hour the chroming is complete. The dyestuff is precipitated by the addition of acetic acid, separated by filtration, washed, and dried. The metallised product is a brown powder, which dissolves in boiling water and in alcohol with a ruby red coloration. With a solution of the dyestuff in nitrocellulose lacquer red coatings can be produced on suitable substrata.

*Example 10*

22.2 parts of the sodium salt of the dyestuff from diazotised 2-amino-1-hydroxybenzene-4-sulphonamide and 2-hydroxynaphthalene-6-sulphonamide are suspended in 100 parts of water, and mixed with 60 parts of the solution of the chromium complex described in Example 2. After boiling the whole for 1 hour the chroming is complete. When worked up the dyestuff is a blue-black powder, which dissolves in boiling water and in alcohol with a ruby red coloration. With a solution of the dyestuff in nitrocellulose lacquer reddish violet coatings can be produced on suitable substrata.

*Example 11*

16.0 parts of the sodium salt of the dyestuff from diazotised 4-chloro-2-amino-1-hydroxybenzene and 2-hydroxynaphthalene are suspended in 100 parts of water, and mixed with 60 parts of the solution of the chromium complex described in Example 2. After boiling the whole for 5 hours the chroming is complete. When worked up the dyestuff is a brown powder which is insoluble in boiling water. It dissolves easily in alcohol with a violet coloration. With a solution of the dyestuff in nitrocellulose lacquer

Example 12

19.8 parts of the sodium salt of the dyestuff from diazotised 5-nitro-4-chloro-2-amino-1-hydroxybenzene and 1-phenyl-3-methyl-5-pyrazolone are suspended in 100 parts of water, and mixed with 60 parts of the solution of the chromium complex described in Example 1. After boiling the whole for 1 hour the chroming is complete. When worked up the dyestuff is a red-brown powder which is soluble in alcohol with a red coloration. With a solution of the dyestuff in nitrocellulose lacquer red coatings can be produced on suitable substrata.

Example 13

33.1 parts of the sodium salt of the dyestuff from diazotised 5-nitro-2-amino-1-hydroxybenzene and 2-hydroxynaphthalene are suspended in 750 parts of water. The suspension is mixed at 80° C. with 130 parts of a solution of sodium chromo-salicylate having a chromium content of 2.6 per cent. The mixture of the dyestuff with the chromium solution is heated for about 10 hours at the boil in a reflux apparatus until the chroming is complete. The precipitated dyestuff is then separated by filtration, washed with water, and the residue is dried. A large part of the salicylic acid used can be regenerated from the filtrate, for example, by acidification with hydrochloric acid.

The dried dyestuff is a dark blue powder insoluble in water, but which dissolves well in alcohol with a reddish blue coloration. With a solution of the dyestuff in nitrocellulose lacquer blue-black coatings can be produced on suitable substrata.

Example 14

0.1 gram-mol of the sodium salt of the dyestuff from diazotised 5-nitro-2-amino-1-hydroxybenzene and 2-hydroxynaphthalene and corresponding to the formula

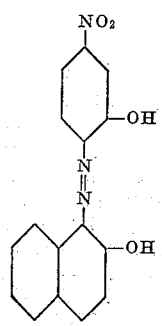

is suspended in the form of a moist paste (filter cake) in 200 grams of water, and mixed with 120 grams (1000 parts=1000 grams) of the solution of the chromium complex described in Example 1. 12 grams of sulphonated castor oil are added, and the whole is boiled for 4 hours in a reflux apparatus. At the end of this period the chroming is complete. The mixture is given a reaction weakly acid to litmus by means of dilute acetic acid, the precipitated dyestuff is separated by filtration, washed with water, and the residue is dried. The dyestuff so obtained is even more soluble in alcohol than the chromium complex obtained as described in Example 13.

What we claim is:

1. Process for the manufacture of a chromiferous dyestuff free from sulphonic acid groups by the action of an agent yielding chromium upon a monoazo-dyestuff being free from sulphonic acid groups and containing the atomic grouping

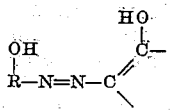

in which R represents a benzene radical wherein the hydroxyl group and the azo-group are in ortho-position relatively to one another, which comprises conducting the treatment with a chromium compound, which contains an ortho-hydroxycarboxylic acid of the benzene series in complex union, in a neutral to alkaline medium and with an amount of the agent yielding chromium corresponding to less than one atom of chromium for each grouping in the dyestuff capable of forming a complex.

2. Process for the manufacture of a chromiferous dyestuff free from sulphonic acid groups by the action of an agent yielding chromium upon a monoazo-dyestuff being free from sulphonic acid groups and containing the atomic grouping

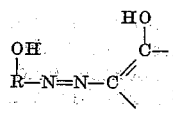

in which R represents a benzene radical, wherein the hydroxyl group and the azo-group are in ortho-position relatively to one another, which comprises conducting the treatment with a chromium compound, which contains 1-hydroxybenzene-2-carboxylic acid in complex union, in a neutral to alkaline medium and with an amount of the agent yielding chromium corresponding to less than one atom of chromium for each grouping in the dyestuff capable of forming a complex.

3. Process for the manufacture of a chromiferous dyestuff free from sulphonic acid groups by the action of an agent yielding chromium upon a monoazo-dyestuff being free from sulphonic acid groups and containing the atomic grouping

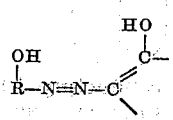

in which R represents a benzene radical, wherein the hydroxyl group and the azo-group are in ortho-position relatively to one another, which comprises conducting the treatment with a chromium compound, which contains 1-hydroxybenzene-2-carboxylic acid in complex union, in a neutral to alkaline medium and in the presence of a dispersing agent and with an amount of the agent yielding chromium corresponding to less than one atom of chromium for each grouping in the dyestuff capable of forming a complex.

4. Process for the manufacture of a chromiferous dyestuff free from sulphonic acid groups by the action of an agent yielding chromium upon a monoazo-dyestuff being free from sulphonic acid groups and containing the atomic grouping

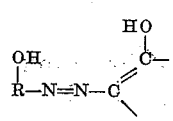

in which R represents a benzene radical, wherein the hydroxyl group and the azo-group are in ortho-position relatively to one another, comprises conducting the treatment with a chromium compound, which contains 1-hydroxybenzene-2-carboxylic acid in complex union, in a neutral to alkaline medium and with an amount of the agent yielding chromium corresponding to less than one atom of chromium for each grouping in the dyestuff capable of forming a complex.

5. Process for the manufacture of a chromiferous dyestuff by the action of an agent yielding chromium upon the monoazo-dyestuff of the formula

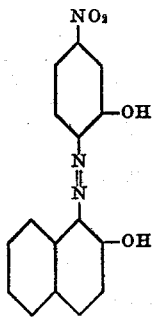

which comprises conducting the treatment with a chromium compound, which contains 1-hydroxybenzene-2-carboxylic acid in complex union, in a neutral to alkaline medium, the amount of chromium corresponding to less than one atom for each molecule of the dyestuff.

6. Process for the manufacture of a chromiferous dyestuff by the action of an agent yielding chromium upon the monoazo-dyestuff of the formula

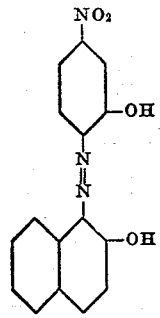

which comprises conducting the treatment in the presence of a dispersing agent with a chromium compound, which contains 1-hydroxybenzene-2-carboxylic acid in complex union, in a neutral to alkaline medium, the amount of chromium corresponding to less than one atom for each molecule of the dyestuff.

7. Process for the manufacture of a chromiferous dyestuff by the action of an agent yielding chromium upon the monoazo-dyestuff of the formula

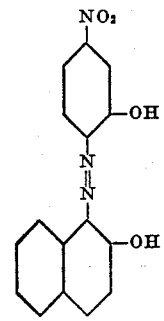

which comprises conducting the treatment in the presence of a sulphonated castor oil with a chromium compound, which contains 1-hydroxybenzene-2-carboxylic acid in complex union, in a neutral to alkaline medium, the amount of chromium corresponding to less than one atom for each molecule of the dyestuff.

8. Process for the manufacture of a chromiferous dyestuff by the action of an agent yielding chromium upon the monoazo-dyestuff of the formula

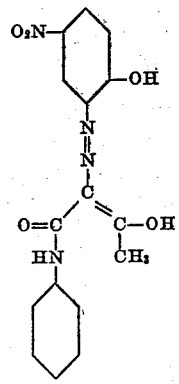

which comprises conducting the treatment with a chromium compound, which contains 1-hydoxybenezene-2-carboxylic acid in complex union, in a neutral to alkaline medium, the amount of chromium corresponding to less than one atom for each molecule of the dyestuff.

9. Process for the manufacture of a chromiferous dyestuff by the action of an agent yielding chromium upon the monazo-dyestuff of the formula

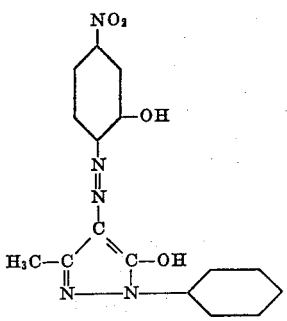

which comprises conducting the treatment with a chromium compound, which contains 1-hydroxybenzene-2-carboxylic acid in complex union, in a neutral to alkaline medium, the amount of chromium corresponding to less than one atom for each molecule of the dyestuff.

WILLI WIDMER.
CHRISTIAN ZICKENDRAHT.

REFERENCES CITED

The following references are of record in the file of this patent:

UNITED STATES PATENTS

| Number | Name | Date |
| --- | --- | --- |
| 1,656,844 | Straub et al. | Jan. 17, 1928 |
| 1,979,913 | Straub et al. | Nov. 6, 1934 |
| 1,993,462 | Straub et al. | Mar. 5, 1935 |
| 1,994,116 | Straub et al. | Mar. 12, 1935 |
| 2,010,613 | Straub et al. | Aug. 6, 1935 |
| 2,305,747 | Straub et al. | Dec. 22, 1942 |
| 2,417,735 | Conzetti et al. | Mar. 18, 1947 |
| 2,428,866 | Conzetti et al. | Oct. 14, 1947 |